United States Patent

(12) United States Patent
Heiligenstein et al.

(10) Patent No.: US 11,650,007 B2
(45) Date of Patent: May 16, 2023

(54) HYDRAULICALLY CONTROLLED CRYOPRESERVATION DEVICE

(71) Applicant: CRYOCAPCELL, Paris (FR)

(72) Inventors: Jérôme Heiligenstein, Paris (FR); Xavier Heiligenstein, Bagneux (FR)

(73) Assignee: CRYOCAPCELL, Paris (FR)

( * ) Notice: Subject to any disclaimer, the term of this patent is extended or adjusted under 35 U.S.C. 154(b) by 0 days.

(21) Appl. No.: 17/264,942

(22) PCT Filed: Aug. 14, 2019

(86) PCT No.: PCT/EP2019/071787
§ 371 (c)(1),
(2) Date: Feb. 1, 2021

(87) PCT Pub. No.: WO2020/035522
PCT Pub. Date: Feb. 20, 2020

(65) Prior Publication Data
US 2021/0302094 A1    Sep. 30, 2021

(30) Foreign Application Priority Data

Aug. 14, 2018  (FR) .................................... 1857488

(51) Int. Cl.
*F25D 29/00* (2006.01)
*F25D 3/10* (2006.01)

(52) U.S. Cl.
CPC ........... *F25D 29/001* (2013.01); *F25D 3/105* (2013.01); *F25D 2400/30* (2013.01)

(58) Field of Classification Search
CPC ................................................. F25D 29/001
See application file for complete search history.

(56) References Cited

U.S. PATENT DOCUMENTS 3,916,640 A * 11/1975 Rasovich ............... F25D 3/105
62/266
4,830,230 A *  5/1989 Powers ..................... G01F 3/10
417/403
2004/0163730 A1* 8/2004 Olson .................... B01L 3/0206
141/130

(Continued)

FOREIGN PATENT DOCUMENTS

CN       101 797 179 A      8/2010
WO         0195716 A2      12/2001

(Continued)

OTHER PUBLICATIONS

International Search Report dated Oct. 21, 2019 in corresponding International Application No. PCT/EP2019/071787 5 pages.

*Primary Examiner* — David J Teitelbaum
(74) *Attorney, Agent, or Firm* — Maier & Maier, PLLC

(57) ABSTRACT

This cryogenic preservation or vitrification device (1) comprises:
  an accumulator (2) including a first volume of pressurised hydraulic oil;
  a control system controlling a valve (20) capable of releasing a second volume of hydraulic oil from the accumulator toward a cylinder (55) by means of a pipe (4);
  a cylinder (55) including a piston (6) configured to be driven by the second volume of hydraulic oil and to displace a first volume of cryogenic fluid to a cryogenic vessel (7) intended to receive a sample (8) to be cryogenically preserved.

13 Claims, 2 Drawing Sheets

(56) References Cited

U.S. PATENT DOCUMENTS

| | | | | |
|---|---|---|---|---|
| 2005/0011580 A1* | 1/2005 | Ziegler | ................... | B67C 3/222 |
| | | | | 141/2 |
| 2005/0084532 A1* | 4/2005 | Howdle | .............. | A61L 27/3804 |
| | | | | 523/122 |
| 2009/0029463 A1* | 1/2009 | Collins | .................... | A01N 1/02 |
| | | | | 435/377 |
| 2018/0058990 A1* | 3/2018 | Deshmukh | ............... | G01N 1/42 |

FOREIGN PATENT DOCUMENTS

| | | | |
|---|---|---|---|
| WO | 2010057589 A1 | 5/2010 | |
| WO | WO-2019195791 A1 * | 10/2019 | ........... A01N 1/0252 |

* cited by examiner

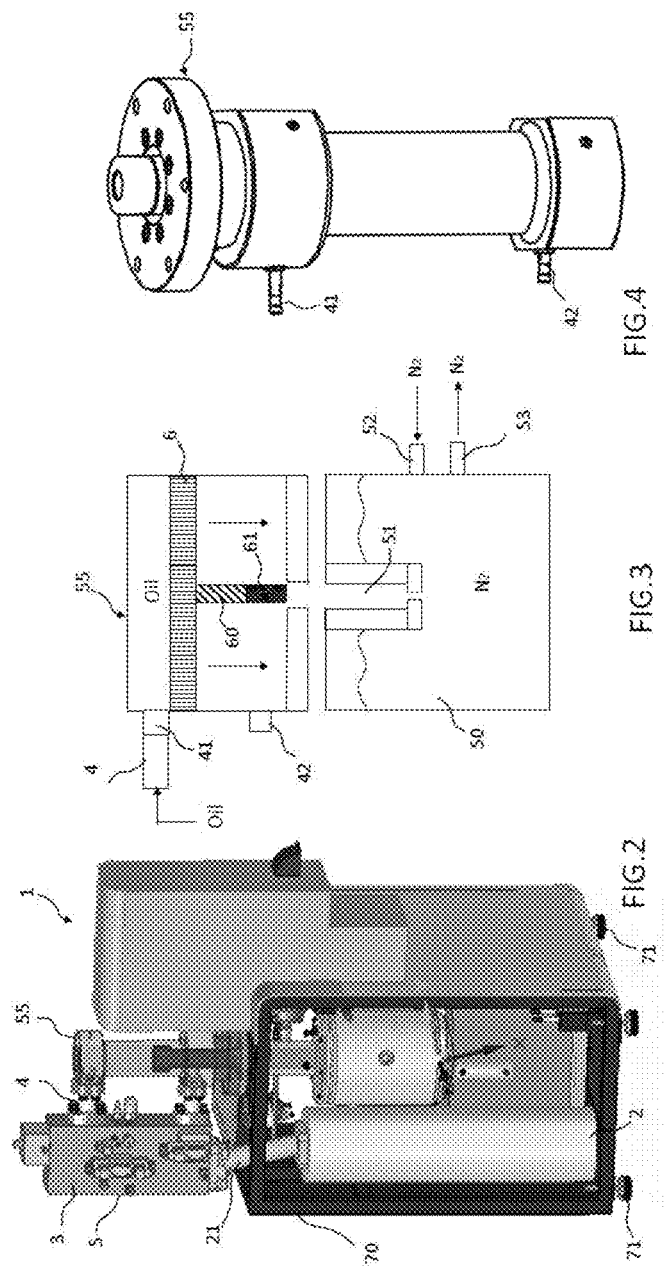

HYDRAULICALLY CONTROLLED CRYOPRESERVATION DEVICE

FIELD

The present invention relates to the field of devices for the cryogenic preservation or vitrification of solutions or components. The invention more particularly relates to cryogenic preservation devices comprising a hydraulic circuit for driving a piston.

BACKGROUND

Devices exist for cryogenically preserving an element, such as a solution or a component, based on systems configured to supply a volume of liquid nitrogen $N_2$, under suitable pressure and temperature conditions, within a cavity wherein the element to be cryogenically preserved is positioned.

Current solutions most often use a system including a piston-type removable part in a cylinder, the movement whereof is engaged by the expansion of a compressed air-type gas. This type of solution allows high displacement velocities of a volume of liquid nitrogen $N_2$ to be achieved in the vessel containing the element to be cryogenically preserved. However, this type of solution has major drawbacks, especially as regards the expansion of gas, which is in particular elastic, the temperature and pressure whereof are not controlled. Moreover, the expansion of gas does not allow the resulting speed of the piston to be controlled. Thus, fast cryogenic preservation speeds can be obtained, however the cryogenic preservation conditions cannot be properly controlled, unless a complex system is defined.

There is a need for the use of a system allowing cryogenic preservation times to be reduced and control over the cryogenic preservation temperature and pressure conditions to be increased, while controlling the displacement speed.

The solutions for allowing the displacement of a piston in a cylinder include hydraulic systems, in particular in the motor or aeronautical sector. However, in order to obtain a rapid displacement of the piston, for example in order to cryogenically preserve an element, a person skilled in the art would be dissuaded from considering this solution as a result of a presumption regarding the viscosity of the hydraulic oils generally used.

As a result, a person skilled in the art would attempt to obtain solutions wherein a gas can be expanded with more energy, while reinforcing the devices for controlling and regulating the displacement of the volume of the gas.

SUMMARY

According to one aspect, the invention relates to a cryogenic preservation or vitrification device, comprising:
- an accumulator including a first volume of pressurised hydraulic oil;
- a control system controlling a valve capable of releasing a second volume of hydraulic oil from the accumulator toward a cylinder by means of a pipe;
- a cylinder including a piston configured to be driven by the second volume of hydraulic oil and to drive a first volume of cryogenic fluid in a cryogenic vessel intended to receive a sample to be cryogenically preserved.

Such an arrangement allows a volume of hydraulic oil to be displaced, the speed and pressure whereof can be controlled, in order to activate a piston with the intention of cryogenically preserving a sample.

As defined by the invention, the term "hydraulic oil" is understood to mean an incompressible hydraulic fluid. According to one embodiment, the hydraulic oil is an ISO VG 46 mineral oil, i.e. having an average kinematic viscosity at 40° C. that lies in the range of about 40 mm$^2$/s to 50 mm$^2$/s.

Within the scope of the invention, the cryogenic fluid is in particular liquid nitrogen $N_2$, i.e. dinitrogen gas cooled to below the boiling point thereof.

According to one embodiment, the accumulator comprises a first volume of hydraulic oil subjected to a pressure of greater than or equal to 200 bar, said pressure being transmitted to the piston so as to generate an outlet pressure exerted on the first volume of cryogenic fluid of greater than or equal to 1,800 bar in a period of time of less than or equal to 5 ms.

According to one embodiment, the accumulator comprises a first volume of hydraulic oil subjected to a pressure of greater than or equal to 200 bar, said pressure being transmitted to the piston so as to generate an outlet pressure exerted on the first volume of cryogenic fluid of greater than or equal to 2,000 bar in a period of time of less than or equal to 2 ms.

According to one embodiment, the accumulator includes a chamber, the volume whereof is deformable and wherein a volume of compressible gas produces a predefined pressure to which the first volume of hydraulic oil of the accumulator is subjected. A constant pressure can thus be exerted on the volume of hydraulic oil in the accumulator.

According to one embodiment, the geometrical configuration of the piston ensures a pressure ratio between the inlet thereof and the outlet thereof that is greater than or equal to 6. Sufficient pressure can thus be achieved at the outlet of the piston, in particular a pressure of greater than or equal to 1,800 bar, so as to activate a physical cryogenic preservation phenomenon for a sample obtained, for example, with liquid nitrogen $N_2$.

According to one embodiment, the device comprises a distribution block, said distribution block conveying the first volume of pressurised hydraulic oil to the cylinder, said distribution block including a first distributor allowing a blasting valve to be activated according to a first given pressure when cryogenic preservation is activated. One advantage of such an arrangement is that it brings the volume of pressurised hydraulic oil as close as possible to the inlet of the cylinder. In particular, the first distributor allows the volume of pressurised hydraulic oil to be conveyed to a distance of several centimetres from the inlet of the cylinder.

According to one embodiment, the distribution block includes a second distributor controlled so as to collect a second volume of cryogenic fluid, the control system controlling the second distributor so as to actuate the piston according to a regime allowing said second volume of cryogenic fluid to be pumped. Thus, the distribution block is capable of performing two functions: on the one hand, pumping cryogenic fluid until a given volume of cryogenic fluid is reached and, on the other hand, blasting in order to send the given volume of cryogenic fluid at a high speed and high pressure to a cryogenic vessel. The distribution block thus allows the given volume of cryogenic fluid, in particular liquid nitrogen $N_2$, to be adjusted.

According to one embodiment, the piston includes an end element configured for collecting a volume of cryogenic fluid in an intermediate chamber. The piston is thus designed for allowing either a volume of cryogenic fluid to be ejected for cryogenic preservation, or a volume of cryogenic fluid to be collected for preparing a quantity for subsequent ejection.

According to one embodiment, a cryogenic fluid reservoir ensures that the volume of cryogenic fluid is maintained in an intermediate chamber. This has the advantage of obtaining parts making up the device that can be easily interchanged and allowing easy maintenance.

According to one embodiment, the second distributor coordinates the evacuation of a volume of hydraulic oil originating from the cylinder consecutively to cryogenic preservation of the sample. The piston can thus be returned to the initial state thanks to the second distributor, without the need for high pressure levels for repositioning the piston.

According to one embodiment, the outlet interface of the accumulator conveying a volume of pressurised hydraulic oil is aligned with the inlet interface of the distribution block, said interfaces being connected by a pipe, the length whereof is less than or equal to 60 cm. Such an arrangement has the advantage of limiting the viscosity effects and of preserving the kinetics during the displacement of the volume of hydraulic oil in the pipe.

According to one embodiment, the outlet interface of the distribution block conveying a volume of pressurised hydraulic oil is aligned with the inlet interface of the cylinder, said interfaces being connected by a pipe, the length whereof is less than or equal to 60 cm. Again, such an arrangement has the advantage of limiting the viscosity effects and of preserving the kinetics during the displacement of the volume of hydraulic oil in the pipe.

According to one embodiment, the cryogenic vessel contains a volume of ethanol. Such a volume of ethanol forms a hydraulic cushion allowing the sample to be protected from the kinetics of the cryogenic fluid used for cryogenic preservation.

According to one embodiment, the cryogenic vessel includes a discharge opening for the evacuation, in particular, of the cryogenic fluid. A new cryogenic preservation blast can thus be rapidly carried out.

BRIEF DESCRIPTION OF THE FIGURES

FIG. 2 is a perspective view of a cryogenic preservation device according to one embodiment of the invention.

FIG. 3 is a diagrammatic view of a cylinder of a cryogenic preservation device according to one embodiment of the invention, the piston whereof is in communication with a chamber containing liquid nitrogen $N_2$ acting as a cryogenic fluid.

FIG. 4 is a perspective view of a cylinder of a cryogenic preservation device according to one embodiment of the invention.

DETAILED DESCRIPTION

Figure 1:
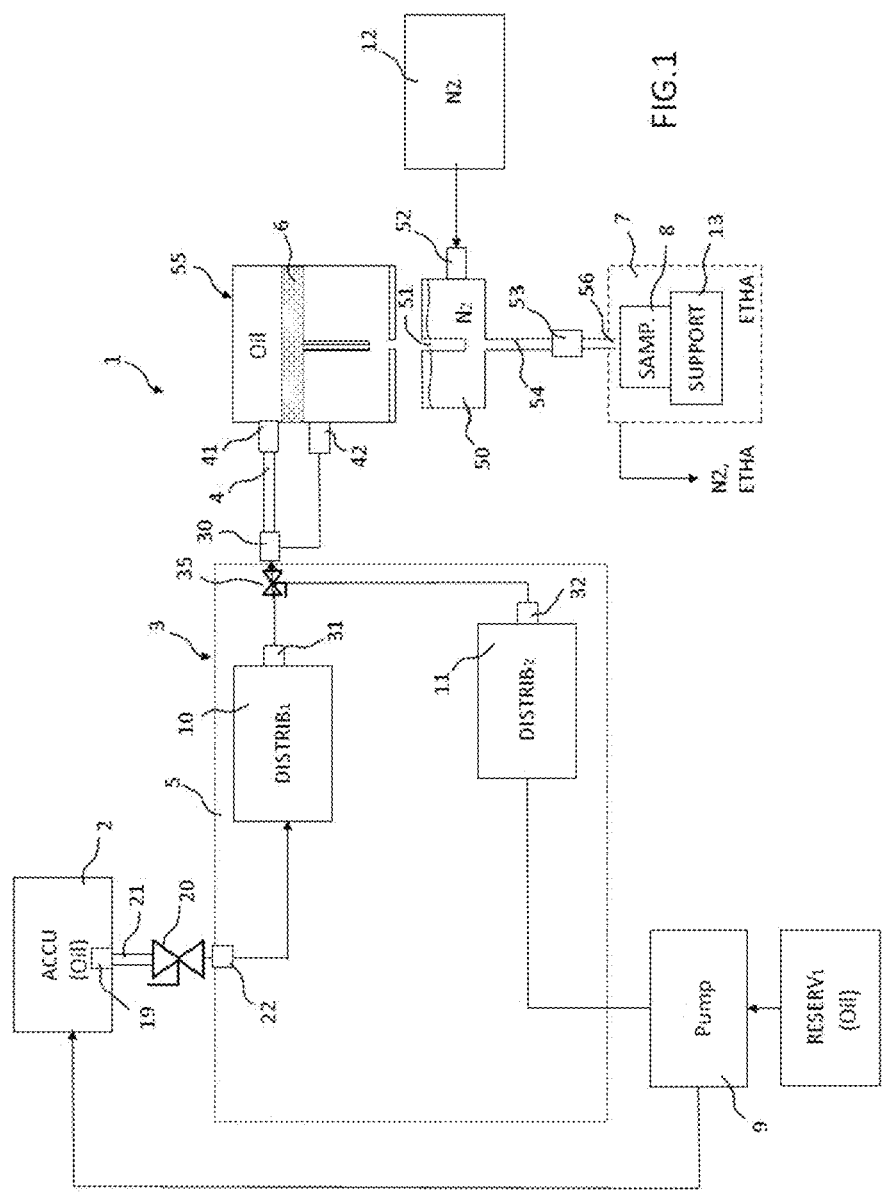
FIG. 1 is a block diagram of the functioning of a cryogenic preservation device according to one embodiment of the invention.

The following description will be better understood upon reading the drawings. For illustration purposes, the device is shown by way of preferred embodiments. However, it must be understood that the present application is not limited to the exact arrangements, structures, features, embodiments and appearance shown. The drawings are not given to scale and are not intended to limit the scope of the claims to the embodiments shown in these drawings. As a result, it must be understood that when features mentioned in the claims are followed by references, said references are included solely with the intention of improving the understanding of the claims and in no way limit the scope of these claims.

FIG. 1 is a block diagram showing the functioning of one embodiment of the invention. The cryogenic preservation device is denoted by the reference numeral 1.

Accumulator

An accumulator 2 includes a volume of pressurised hydraulic oil, for example at between 250 and 450 bar. According to one example, the pressure of the hydraulic oil in the accumulator 2 lies in the range 300 to 400 bar. According to one embodiment, the accumulator 2 is a piston accumulator. According to one embodiment, the accumulator 2 comprises an inlet allowing a volume of hydraulic oil of the device 1 to be re-conveyed, which volume of hydraulic oil has been used and which shall be reused for cryogenic preservation.

According to one embodiment, the accumulator 2 includes a chamber, the volume whereof is deformable (not shown in the figures), containing pressurised liquid nitrogen $N_2$ allowing a volume of hydraulic oil to be maintained under a substantially constant pressure. According to one embodiment, the accumulator 2 can thus be supplied with hydraulic oil by an external pump 9 in order to constantly have a supply. According to one embodiment, the pump 9 allowing a level of pressurised hydraulic oil to be maintained in the accumulator can be a pump that further allows hydraulic oil to be supplied to other pieces of equipment of the device 1.

The accumulator 2 includes an outlet 19 for feeding a volume of hydraulic oil $V_{1H}$ to a distribution block 3 which comprises, according to one embodiment, different distributors 10, 11. A channel or pipe 21 is advantageously arranged between the accumulator 2 and the distribution block 3.

Distribution Block

In the embodiment shown in FIG. 2, the distribution block 3 comprises a drilled block 5. The latter can, for example, be made of cast iron or steel. According to one example, the drilled block 5 forms a compact, solid block. The drilled block 5 includes recesses and openings intended to receive hydraulic elements, such as valves, non-return valves, fittings, pipes, elbows, regulators, controllers, positioners, stopcocks, and cut-off valves, etc. The distribution block 3 thus comprises the drilled block 5 and the different hydraulic elements arranged in the drilled block 5.

According to one example embodiment, the distribution block 3 includes two distributors 10, 11.

A first distributor 10 allows a first operating mode of the distribution block 3 to be obtained in order to carry out a cryogenic preservation action. In this embodiment, the distributor 10 is supplied by the accumulator 2. For this purpose, as shown in FIG. 1, the distribution block 3 includes an inlet 22 for receiving the hydraulic oil originating from an inlet valve 20 conveying the oil from the accumulator 2.

A second distributor 11 allows a second operating mode of the distribution block 3 to be obtained in order to pump a volume of liquid nitrogen $N_2$ required for a subsequent cryogenic preservation step.

In particular, the coordination thereof allows volumes of pressurised hydraulic oil to be injected into and evacuated from a cylinder 55 in order to sequence the steps of pumping a volume of liquid nitrogen $N_2$ and of cryogenically preserving a sample 8. For this purpose, the cylinder 55 includes an inlet 41 for receiving a volume of hydraulic oil originating from the distribution block 3.

A valve 20 is controlled from a control module (not shown). The opening and closing thereof can, for example, be controlled by way of a mechanical and/or electrical setpoint automatically generated according to a programming of the hydraulic system or manually from a control interface intended for use by a user.

The hydraulic circuit can be used in two different ways. The first way comprises the extraction of a volume of hydraulic oil from the accumulator 2 at a high pressure, for example 350 bar, in order to cryogenically preserve an element using liquid nitrogen $N_2$ as a cryogenic fluid, which corresponds to the first so-called "cryogenic preservation" operating mode. The second way comprises the extraction of a volume of oil from a hydraulic oil reserve by way of a pump 9 at a pressure of less than or equal to 350 bar, for example at a pressure of about 50 bar, in order to pump a given volume of liquid nitrogen $N_2$ as a cryogenic fluid, which corresponds to the second so-called "pumping" operating mode. According to one embodiment, the pump 9 supplying the accumulator 2 can be configured such that it also supplies the distributor 11. The pump 9 is advantageously connected to a hydraulic oil reserve $RESERV_1$.

First and Second Operating Modes: Cryogenic Preservation and Pumping

Either of the two cryogenic preservation and pumping operating modes can be controlled from a control interface. A setpoint allows the hydraulic circuit to be activated in either of the two operating modes.

By way of example, the two operating modes can be used successively, for example when a given volume of liquid nitrogen $N_2$ is initially pumped in order to then be used in a cryogenic preservation operation. One advantage of using the pumping mode is the perfect control over the quantity of nitrogen $N_2$ injected and the pressure thereof. Moreover, air pockets, where relevant, are eliminated.

According to one embodiment, the device 1 of the invention comprises a first distributor 10 controlling the hydraulic circuit in order to convey a volume of pressurised hydraulic oil to the interior of the cylinder 55. For this purpose, a first distribution circuit, forming a sub-assembly of the hydraulic circuit, allows control functions to be carried out on the hydraulic circuit: acceleration or deceleration of valve openings, control of the non-return valves, control of stopcocks, management of the rising and falling movements of the pump, drainage and discharge of the volumes of hydraulic oil and liquid nitrogen $N_2$ consumed, and pressure control measurement at different points of the hydraulic circuit.

When the pumping function is actuated according to the second operating mode, the hydraulic circuit extracts a volume of hydraulic oil from a reserve $RESERV_1$ by way of a pump 9 at a lower pressure than the pressure required to generate a displacement of the piston 6 for cryogenic preservation. The displacements of the piston 6 are thus carried out at a speed allowing a quantity of liquid nitrogen $N_2$ to be extracted from a reserve 50. The pumping takes place thanks to a rising and falling movement of the piston 6. The quantity of nitrogen $N_2$ extracted is calculated for a given element to be cryogenically preserved or vitrified.

Finally, once the quantity of liquid nitrogen $N_2$ collected is sufficient, the cryogenic preservation operation can begin by the activation of the first distributor 10 supplied by the accumulator 2.

Third Operating Mode: Piston Return

A third operating mode of the distributor 10 corresponds to the pressure regime after carrying out a blast for cryogenic preservation. The distributor 11 allows a pressure to be generated, driving the piston 6 to the original position thereof, ready for another blast. According to one embodiment, the device 1 of the invention includes a plurality of pressure measuring points, for example produced using pressure gauges. The pressure gauges can be arranged at different locations: at the outlet of the accumulator 2, at the outlet of the pump 9, at the inlet and outlet of the distributor 10, at the inlet and outlet of the distributor 11. The checkpoints allow the controls to be servo-controlled as a function of a set point to be reached. Pressure regulators or valve opening and closing aids can be implemented in order to ease the transmission of the volume of hydraulic oil to the piston 6 of the cylinder 55.

According to one embodiment, a hydraulic aid aiding the opening movement of the blasting valve 35 can be arranged such that the opening of the valves can be prevented from disadvantaging the pressure gradient of the hydraulic oil injected towards the piston 6.

According to one embodiment, the hydraulic circuit conveying the volume of pressurised hydraulic oil is inserted into the cylinder 55 in contact with the piston 6. An inlet 41 allows the volume of hydraulic oil to be inserted into the cylinder 55 after the passage thereof through the pipe 4. One advantage of the device 1 of the invention is that the distance between the outlet of the distribution block 3 and the inlet of the cylinder 55 is reduced as far as possible. According to one embodiment, the hydraulic circuit between the outlet of the accumulator 2 and that of the distributor 10 allows the pressure of the hydraulic oil to be maintained and controlled. The distributor 10 comprises a blasting valve 35 which, in the first so-called "cryogenic preservation" operating mode, is coordinated with the opening of the valve 20 of the accumulator 2 such that the opening thereof releases a volume of hydraulic oil, the pressure whereof is substantially equal to the outlet pressure of the accumulator 2.

Pipes

In order to reduce the viscosity effects between the accumulator 2 and the distribution block 3, a first pipe 21 is arranged between the two elements 2 and 3. The length of the first pipe 21 is reduced as far as possible by arranging the outlet of the accumulator 2 directly facing the inlet of an inlet valve 20 of the distribution block 3. Preferentially, the valve 20 is included in the distribution block 3. According to one preferred arrangement, the accumulator 2 is arranged beneath the distribution block 3 such that the first pipe 21 is positioned vertically. This arrangement allows minimal overall dimensions to be obtained, as well as a length of the pipe 21 that lies in the range 6 cm to 60 cm. The diameter of the first pipe 21 is determined such that the viscosity effects are reduced during the displacement of the hydraulic oil. The diameter is greater than or equal to 2 cm, preferentially greater than or equal to 4 cm. According to one embodiment, the diameter of the first pipe 21 lies in the range 5 to 10 cm. According to one embodiment, the accumulator 2 is arranged above the distribution block 3 in the same configuration, allowing the first pipe 21 to be oriented vertically.

In order to reduce the distance between the outlet of the distribution block 3 and the inlet in the cylinder 55, a second pipe 4 is arranged between the cylinder 55 and the distribution block 3. According to one embodiment, the second pipe 4 is substantially straight. According to one embodiment, the second pipe 4 is oriented horizontally in order to control the turbulent flow, gravity and viscosity effects. Finally, this disposition allows the overall dimensions of the machine to be reduced. According to one embodiment, the length of the pipe 4 lies in the range 10 to 50 cm. According to one example embodiment, the length of the second pipe 4 lies in the range 8 cm to 20 cm. According to one embodiment, the length of the second pipe 4 lies in the range 20 to 40 cm. According to one example, the length of the second pipe 4 lies in the range 25 to 30 cm. The diameter of the second pipe 4 is large enough to prevent viscosity effects, the diameter is greater than or equal to 2 cm, preferentially greater than or equal to 5 cm. According to one embodiment, the diameter of the second pipe 4 lies in the range 6 to 10 cm.

According to various examples, the pipes 4 and 21 can be made of different materials and can comprise different thicknesses. The mechanical strength must be dimensioned so as to withstand a pressure of 350 to 400 bar minimum. According to one embodiment, the pipes have a thickness of 1 to 6 mm and are, for example, made of metal. According to one example, the pipes 4, 21 are braided metal hoses or tubes for receiving the hydraulic oil.

Piston

The hydraulic oil injected into the cylinder 55 drives the displacement of the piston 6.

According to one embodiment, the piston 6 includes an inlet surface area intended to be in contact with the hydraulic oil ranging from 7 to 20 times the outlet surface area of the piston 6 intended to eject a volume of gas, for example liquid nitrogen $N_2$, used for cryogenic preservation. According to one embodiment, the area ratio lies in the range 10 to 16. According to one embodiment, the ratio lies in the range 5 to 10. In the example wherein the hydraulic oil is at a pressure of 350 bar, the pressure of the liquid nitrogen $N_2$ at the outlet of the piston 6 for cryogenically preserving the element can advantageously be equal to about 2,300 bar. The inlet and outlet surface area ratio is preferentially greater than or equal to 6.5.

The piston 6 is thus dimensioned so as to satisfy the first operating mode, i.e. so as to inject a volume of liquid nitrogen $N_2$ into a vessel 7. According to different embodiments, the piston 6 can travel different strokes in order to adjust a pressure of liquid nitrogen $N_2$ in the vessel 7. According to one embodiment, the stroke of the piston 6 can lie in the range 160 mm to 240 mm According to one example, the stroke is equal to 200 mm.

By applying a lower pressure to the surface of the piston 6, the latter can move such that it pumps a volume of liquid nitrogen $N_2$ in a reservoir 50 forming an intermediate chamber in order to extract a predefined quantity. The advantage of such an intermediate chamber 50 is that it forms both a reservoir in which the piston 6 is capable of pumping a volume of liquid nitrogen $N_2$ and a channel allowing the outlet pressure of the liquid nitrogen $N_2$ to be transferred in order to carry out cryogenic preservation by generating a volume of fluid to be sent into the cryogenic vessel. A predefined quantity is collected in a plurality of movements of the piston 6, allowing the desired level of liquid nitrogen $N_2$ for cryogenic preservation to be reached. Then, according to the first operating mode, the piston 6 drives, at a high pressure, the displacement of a volume of liquid nitrogen $N_2$ towards a vessel 7 wherein the sample to be cryogenically preserved is held.

In the embodiment shown in FIG. 3, the piston 6 comprises an outlet end fitting 61 acting as a syringe or pipette in order to satisfy the pumping function. The syringe thus penetrates the intermediate reservoir 50 and extracts a volume of liquid nitrogen $N_2$. A channel 51 adapted to receive the end fitting of the piston 6 can be arranged such that it opens out into the intermediate reservoir 50. The back and forth movement of the end fitting 61 allows a function for pumping a volume of liquid nitrogen $N_2$ to be carried out. According to one embodiment, the pumping function for ensuring the back and forth movements of the piston 6 can be procured by the distributor 11 in addition to valves and/or non-return valves controlled by a computer, for example of the control system. In order to activate this second operating mode, i.e. the pumping mode, the distributor 11 is controlled such that it injects a volume of hydraulic oil via the channel forming the pipe 4 and extracts a volume of hydraulic oil via an outlet interface 42 of the cylinder 55. The extraction of the volume of hydraulic oil via the outlet 42 is carried out consecutively to the injection in order to reposition the piston 6 into the initial position thereof.

The pipe 4 allowing for the transfer of a volume of pressurised hydraulic oil from the distributor 10 of the distribution block 3 to the cylinder 55 comprises a distal end advantageously interfacing with an inlet interface 41 of the cylinder 55.

In order to balance the pressure levels and maintain the level of liquid nitrogen $N_2$ pumped, a reserve 12 of liquid nitrogen $N_2$ is used to inject a level of liquid nitrogen $N_2$ into the reservoir 50. An inlet 52 associated, for example, with a non-return valve or a valve can be implemented in order to ensure that a given level of liquid nitrogen $N_2$ is reached. The inlet 52 thus forms an interface with the intermediate reservoir 50.

According to one embodiment, the sample 8 to be cryogenically preserved is arranged in a vessel 7. According to one embodiment, the vessel 7 allows liquid nitrogen $N_2$ to pass, while protecting the sample 8 from the kinematics of the injected gas. According to one embodiment, the vessel 7 corresponds to a chamber including an opening 56 disposed in the continuation of an outlet pipe 54 of the intermediate reservoir 50.

According to one embodiment, the intermediate reservoir 50 includes a non-return valve 53 configured to discharge the volume of liquid nitrogen $N_2$ towards the vessel 7 when a given pressure threshold is exceeded. Thus, when the first operating mode is activated, the blasting valve 35 drives a displacement of the piston 6 allowing pressurisation of a quantity of nitrogen $N_2$ to be injected into the vessel 7. Given that the pressure is greater than the given threshold, the non-return valve 53 opens and releases the quantity of nitrogen $N_2$ required to cryogenically preserve the sample 8.

According to the second operating mode, corresponding to the pumping of a volume of liquid nitrogen $N_2$, the displacement of the piston 6 is slow enough for the nitrogen $N_2$ pressure to be less than the given threshold. Under these conditions, the non-return valve 53 remains closed and does not release nitrogen $N_2$ into the vessel 7. Thus, the non-return valve 53 is configured such that it allows or prevents release of a volume of liquid nitrogen $N_2$ into the vessel 7. One advantage is that the components are pooled so as to ensure operation in both the first and second operating modes.

According to one embodiment, a volume of ethanol ETHA is inserted into the vessel 7 so as to promote the action of the nitrogen $N_2$ on the sample 8. The presence of a volume of ethanol allows a hydraulic "cushion" to be formed during the injection of the nitrogen $N_2$, thus protecting the sample 8.

According to one embodiment, the sample 8 is advantageously disposed on a surface of a removable support 13 which can be easily inserted into the vessel 7 and withdrawn from the vessel 7. After the cryogenic preservation operation, an outlet of the vessel 7 allows the volumes of liquid nitrogen $N_2$ and of ethanol ETHA inserted and/or confined therein to be discharged.

FIG. 2 shows one compact example arrangement of the device 1 of the invention. In this example arrangement, the accumulator 2 is disposed beneath the distribution block 3. In other words, the accumulator 2 and the distribution block 3 are arranged in the same alignment according to the axis of the largest dimension thereof. One advantage is that this shortens the length of the pipe 21 as far as possible.

According to one embodiment, the valve 20 is arranged between the pipe 21 and the accumulator 2. According to another embodiment, the valve 20 is arranged between the pipe 21 and the distribution block 3.

According to one embodiment, as shown for illustration purposes in FIG. 2, the device 1 of the invention comprises leg assemblies 71. Moreover, according to one embodiment, the device 1 comprises a frame 70 maintaining the different elements of the device 1 according to a determined arrangement. One advantage thereof is to allow the displacement of the device 1 in one piece, without having to disassemble the different elements separately for installation in a given location. Another advantage of the frame 70 is to accurately arrange the cylinder 55 in alignment with a reservoir of liquid nitrogen $N_2$ or a gas discharge reservoir after cryogenic preservation. The frame 70 allows the drilled block 5 to be supported by means of a planar surface forming a support, in particular allowing certain impacts to be absorbed.

FIG. 4 is a perspective view of one embodiment of a cylinder 55. FIG. 4 shows the inlet interface 41 and outlet interface 42 for the hydraulic oil which are used to displace the piston inside the cylinder 55. The inlet interface 41 and outlet interface 42 allow the cylinder 55 to be connected to the distribution block 3. Advantageously, the distribution block 3 is arranged such that it allows the outlet interface 30 thereof to be aligned with the inlet interface 41 of the cylinder 55. The outlet 30 of the distribution block 3 is advantageously aligned with the outlet 31 of the distributor 10 and thus with the inlet 41 of the cylinder 55. The pipe 4 is thus advantageously disposed between the inlet 41 of the cylinder 55 and the outlet 30 of the distribution block 3.

According to one example, the outlet 32 of the second distributor 11 is aligned with the outlet 42 of the cylinder 55 (configuration not shown). According to another example, the outlet 32 of the second distributor 11 is not aligned with the outlet 42 of the cylinder 55. In the second operating mode, i.e. the pumping operation mode, the conveying of the fluids from the distribution block 3 to the cylinder 55 or vice-versa can take place in pipes able to withstand lower physical constraints than in the configuration of the first operating mode, corresponding to a blast for cryogenic preservation. More specifically, the pressures of the fluids displaced in the second operating mode are less than the pressures of the fluids displaced in the first operating mode.

Thus, this configuration allows for an alignment of the outlet 31 of the distributor 10 of the distribution block 3 with the inlet 41 of the cylinder 55 by means of the pipe 4. This arrangement procures a displacement of the fluids injected at high speed and at high pressure, while preserving as best as possible the kinematics and dynamics of the fluids between the inlets/outlets 31 and 41. Thus, the pressure of the fluid at the outlet of the distributor 10 is substantially preserved at the inlet of the piston 6.

According to one embodiment, the cylinder 55 can comprise, for example, a cylindrical chamber. The piston 6 is a movable part moving between a first position and a second position. The positions of the piston 6 are reached thanks to the pressures and back-pressures exerted on the one or more actuating surfaces of the piston 6.

When the piston 6 is driven under the effect of a displacement of a volume of pressurised hydraulic oil $V_{1H}$, a first part of the piston 6 including an inlet section is subjected to an inlet pressure of the volume of hydraulic oil resulting in the displacement of the piston 6. A second part 60 of the piston including an outlet section is thus driven towards a volume of liquid nitrogen $N_2$ at a high speed.

The displacement speed of the piston 6 depends on the inlet flow rate of the hydraulic oil according to which cryogenic preservation, pumping of a volume of liquid nitrogen $N_2$ or even repositioning of the piston 6 are carried out after a first displacement during the first operating mode.

The cross-sectional area ratio of the piston 6 is advantageously designed to provide an outlet pressure that is sufficient for promoting cryogenic preservation of the sample in a very short time, for example, in a lapse of time of less than or equal to 10 ms, preferentially less than or equal to 5 ms. According to one embodiment, cryogenic preservation is carried out within a period of time substantially close to 1 ms. In the example shown in FIG. 3, the end of the second part 60 of the piston 6 includes a distal element 61 allowing a volume of liquid nitrogen $N_2$ to be collected. When the pressure of the hydraulic oil at the inlet of the piston 6 is controlled, the latter is displaced such that it penetrates the intermediate reservoir 50 containing a volume of liquid nitrogen $N_2$. When the end 61 is displaced during the return travel thereof towards the upper part of the cylinder 55, a volume of liquid nitrogen $N_2$ has been collected. The collection of this volume can take place by aspiration in the channel wherein the second part 60 of the piston 6 moves. The distal element 61 acts as an extractor to extract a volume of liquid nitrogen $N_2$. Different embodiments can be considered in order to collect a volume of liquid nitrogen $N_2$ according to the principle of a syringe, a pipette or any other principle allowing a volume of liquid nitrogen $N_2$ to be collected. The operation is thus repeated until a desired volume of liquid nitrogen $N_2$ is obtained, which will then be used to cryogenically preserve the sample 8.

According to one embodiment, the channel wherein the second part 60 of the piston 6 moves constitutes a chamber 51 which can be dimensioned to receive a total volume of liquid nitrogen $N_2$ that has been predefined according to the cryogenic preservation need.

Although various embodiments have been described and shown, the detailed description hereinabove must not be considered to be limited thereto. Various modifications can be made to the embodiments by a person skilled in the art without deviating from the true spirit of the invention as defined by the claims.

The invention claimed is:

1. A cryogenic preservation or vitrification device, comprising:
   an accumulator including a first volume of pressurised hydraulic oil ($V_{1H}$);
   a control system controlling an opening and closing of a valve capable of releasing a second volume of hydraulic oil ($V_{2H}$) from the accumulator toward a cylinder by means of a pipe;
   said cylinder including a piston configured to be driven by the second volume of hydraulic oil ($V_{2H}$) and to drive a first volume of cryogenic fluid ($V_{1A}$) in a cryogenic vessel intended to receive a sample to be cryogenically preserved,
   wherein the piston includes an end element configured for collecting a volume of cryogenic fluid in an intermediate chamber.

2. The device according to claim 1, wherein the accumulator comprises the first volume of hydraulic oil ($V_{1H}$) subjected to a pressure of greater than or equal to 200 bar, said pressure being applied to the piston so as to generate an outlet pressure exerted on the first volume of cryogenic fluid ($V_{1A}$) of greater than or equal to 1,800 bar in a period of time of less than or equal to 5 ms.

3. The device according to claim 1, wherein the accumulator comprises the first volume of hydraulic oil ($V_{1H}$) subjected to a pressure of greater than or equal to 200 bar, said pressure being applied to the piston so as to generate an outlet pressure exerted on the first volume of cryogenic fluid ($V_{1A}$) of greater than or equal to 2,000 bar in a period of time of less than or equal to 2 ms.

4. The device according to claim 1, wherein the accumulator includes a chamber, the volume whereof is deformable, wherein a volume of compressible gas produces a predefined pressure to which the first volume of hydraulic oil of the accumulator is subjected.

5. The device according to claim 1, wherein a geometrical configuration of the piston ensures a pressure ratio between a piston inlet thereof and a piston outlet that is greater than or equal to 6.

6. The device according to claim 1, comprising a distribution block, said distribution block conveying the first volume of pressurised hydraulic oil ($V_{1H}$) to the cylinder, said distribution block including a first distributor allowing a blasting valve to be activated according to a first given pressure when cryogenic preservation is activated.

7. The device according to claim 6, wherein the distribution block includes a second distributor controlled so as to collect a second volume of cryogenic fluid ($V_{2A}$), the control system controlling the second distributor so as to actuate the piston according to a regime allowing said second volume of cryogenic fluid ($V_{2A}$) to be pumped.

8. The device according to claim 7, wherein the second distributor coordinates an evacuation of a volume of hydraulic oil originating from the cylinder consecutively to cryogenic preservation of the sample.

9. The device according to claim 6, wherein an outlet interface of the accumulator conveying a volume of pressurised hydraulic oil is aligned with an inlet interface of the distribution block, said interfaces being connected by a pipe, the length whereof is less than or equal to 60 cm.

10. The device according to claim 6, wherein an outlet interface of the distribution block conveying a volume of pressurised hydraulic oil is aligned with an inlet interface of the cylinder, said interfaces being connected by a pipe, the length whereof is less than or equal to 60 cm.

11. The device according to claim 1, wherein a cryogenic fluid reservoir ensures that a volume of cryogenic fluid is maintained in an intermediate chamber.

12. The device according to claim 1, wherein the cryogenic vessel contains a volume of ethanol.

13. The device according to claim 1, wherein the cryogenic vessel includes a discharge opening for an evacuation.

\* \* \* \* \*